United States Patent [19]

Thompson

[11] Patent Number: 4,516,200
[45] Date of Patent: May 7, 1985

[54] DATA COMMUNICATIONS SYSTEM WITH HOST CHARACTER TERMINAL MODE

[75] Inventor: E. Earle Thompson, Dallas, Tex.

[73] Assignee: Texas Instruments Incorporated, Dallas, Tex.

[21] Appl. No.: 264,905

[22] Filed: May 18, 1981

[51] Int. Cl.³ .............................................. H04J 6/00
[52] U.S. Cl. .................................................. 364/200
[58] Field of Search ............. 364/200, 900; 179/1 SA

[56] References Cited

U.S. PATENT DOCUMENTS

| | | | |
|---|---|---|---|
| 3,750,107 | 7/1973 | Pyne | 364/200 |
| 4,225,918 | 9/1980 | Beadle et al. | 364/200 |
| 4,291,198 | 9/1981 | Anderson et al. | 364/900 |
| 4,301,328 | 11/1981 | Dorias | 179/1 SA |
| 4,328,557 | 5/1982 | Gastinel | 364/900 |
| 4,332,027 | 5/1982 | Malcolm et al. | 370/94 |
| 4,377,852 | 3/1983 | Thompson | 364/900 |
| 4,387,440 | 6/1983 | Eaton | 364/900 |
| 4,399,331 | 8/1983 | Brown et al. | 179/5 R |

OTHER PUBLICATIONS

"Basics of Data Communications", McGraw Hill Publications Co., Edited by Harry R. Karp, 1976.
"An Answer/Originate Modem", Parson, Jun. 1980, *Byte* Magazine.

*Primary Examiner*—Gareth D. Shaw
*Assistant Examiner*—Tim A. Wiens
*Attorney, Agent, or Firm*—Robert D. Marshall, Jr.; N. Rhys Merrett; Melvin Sharp

[57] ABSTRACT

A data communication system for controlling communications between a host data processing system and a remote data processing system. The host system communicates a plurality of output condition data signals to the remote system for storage therein. The host system then specifies the recall and output of the condition data signals previously stored in the remote system by transmitting corresponding condition name signals. The host system specifies whether condition data signals or condition name signals are to be sent to the remote system. The host system may send a predetermined number of condition data signals for storage at fixed sequential addresses within the remote system or the host system may specify particular addresses for storage of particular data signals in a memory within the remote system which has previously stored therein a set of default condition data signals. The remote system may include a means for repeating outputs specified by the host system. These outputs may be visual or tonal outputs. In a preferred embodiment the remote data processing system employs a central processing unit under program control via a plug-in ROM module.

19 Claims, 14 Drawing Figures

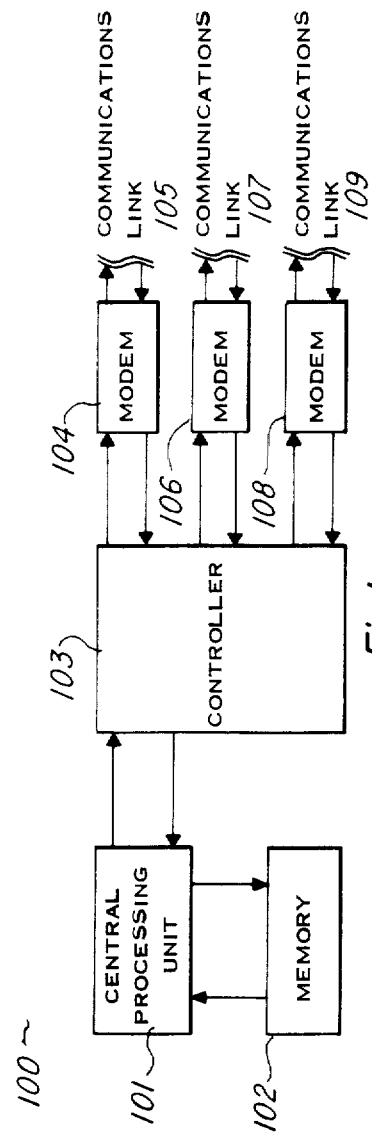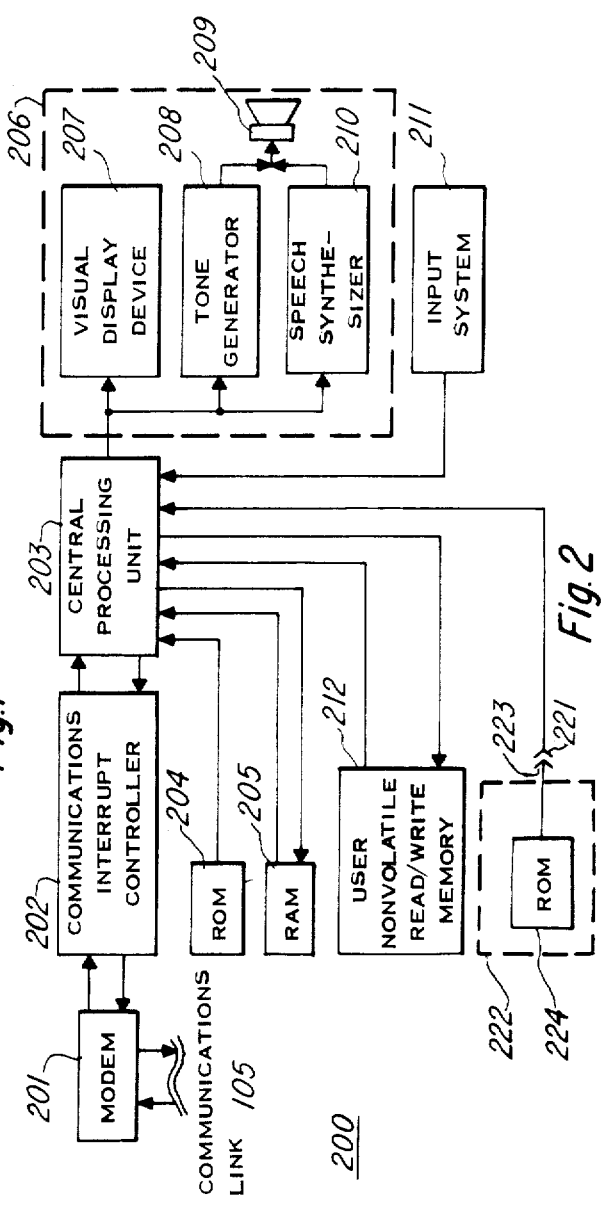

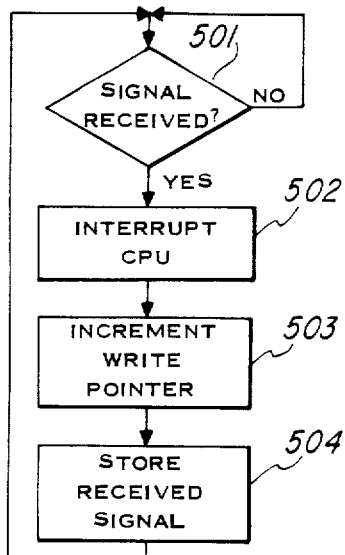
Fig. 5
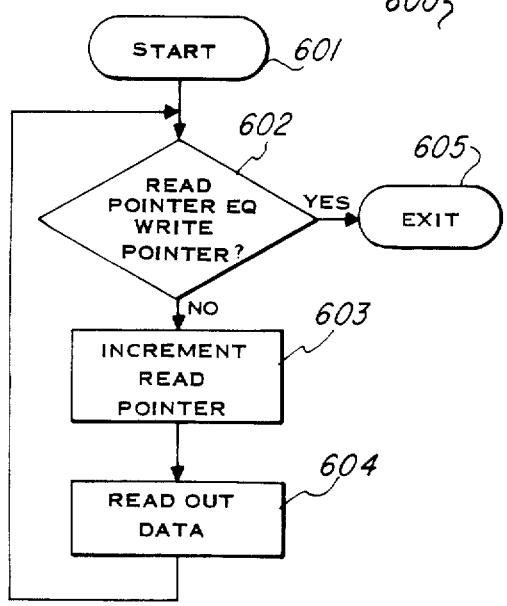
Fig. 6
Fig. 7

DATA COMMUNICATIONS SYSTEM WITH HOST CHARACTER TERMINAL MODE

BACKGROUND OF THE INVENTION

The need for the present invention arises from the recent great increase in the number and distribution of small computer systems for home and business use. These small computer systems typically include a limited amount of processing power and a severely limited amount of memory. The rapid rise in the number of these small computer systems in use has greatly increased the number of and distribution of persons using computer systems. This has served to whet the appetite of many such users and many of these users now feel a need for computer systems with greater processing power and memory for expanded use.

At the same time as the rise in number and distribution of these small computer systems, a number of data processing and/or data base services have evolved. Typically these services provide data processing and/or data base management and transmission to numerous users on a time share basis. Typically these systems communicate with their users by acoustical tones transmitted on ordinary telephone lines. As the number and use of small computers increases and the number and variety of these data processing and/or data base services increases, these services will eventually become virtual public utilities providing widely desired services to numerous people.

Currently and in the expected future the data processing and/or data base services mentioned above charge their customers based upon on connect time, that is the amount of time the user is connected to and interacting with the system, or on the basis on the data processing services, or data base services performed on a combination of each of these systems. Due to the expected increase in the number of both small computing systems employed by users and data processing and/or data base services, there is an increasing need for means for effectuating efficient communications between the users and these evolving public utilities. Any means which will minimize the data rate required for a particular communication or which will efficiently interact between the user and the service with a minimum of waiting time will enable the user to reduce the charge of the service based upon connect time.

SUMMARY OF THE INVENTION

It is an object of the present invention to enable data communication between a host data processing system and a remote data processing system in a manner requiring a minimal data rate. In order to achieve this end the host data processing system initially sends a set of condition data signals to the remote data processing system for storage therein. Once a fixed set of condition data signals have been stored within the remote data processing system, the host data processing system sends a set of condition name signals to the remote data processing system which causes the remote data processing system to recall and output corresponding condition data signals. Because the condition name signal corresponds to the address at which the condition data signals are stored within the remote data processing system, this system enables the host data processing system to specify the remote data processing system output with a transmission of a minimum number of data bits.

It is a further object of the present invention to provide a data communication system of the above described type in which the host processing system sends mode signals to alert the remote data processing system as to whether condition data signals or condition name signals are being sent.

In one preferred embodiment of the data communication system of this invention, the host data processing system sends a set of a predetermined number of condition data signals which are stored at predetermined address locations within the remote data processing system.

In another embodiment of the data communication system of the present invention, the host data processing system sends a memory location signal to the remote data processing system to specify the address within the memory at which the condition data signals are to be stored. In this embodiment it is preferable that these condition data signals be stored in locations within a memory of the remote data processing system which has been previously loaded with a plurality of default condition data signals. Thus the host data processing system may either specify an output in accordance with a previously stored default condition data signal or may send a condition data signal for storage within some portion of the memory of the remote data processing system and specify an output in accordance with that previously transmitted condition data signal.

It is a further object of the present invention to enable the remote data processing system to repeat the output previously specified by the host data processing system transmitted condition name signals, by recalling signals from memory within the remote data processing system, without requiring retransmission of the condition name signals.

BRIEF DESCRIPTION OF THE DRAWINGS

The above and other objects of the present invention will become clear from the following description of the invention taken in conjunction with the drawings wherein:

FIG. 1 illustrates the structure of a preferred embodiment of the host data processing system employed to practice the present invention;

FIG. 2 illustrates the structure of a preferred embodiment of the remote data processing system employed to practice the present invention;

FIG. 5 illustrates a flow chart of the interrupt program used to store received characters in a preferred embodiment of the remote data processing system of the present invention;

FIG. 6 illustrates a flow chart of the received data read subroutine in a preferred embodiment of the remote data processing system of the present invention;

FIG. 7 illustrates a flow chart of one embodiment of the program employed in the host data processing system according to a first aspect of the present invention;

DETAILED DESCRIPTION OF THE PREFERRED EMBODIMENTS

Figures 3, 4:
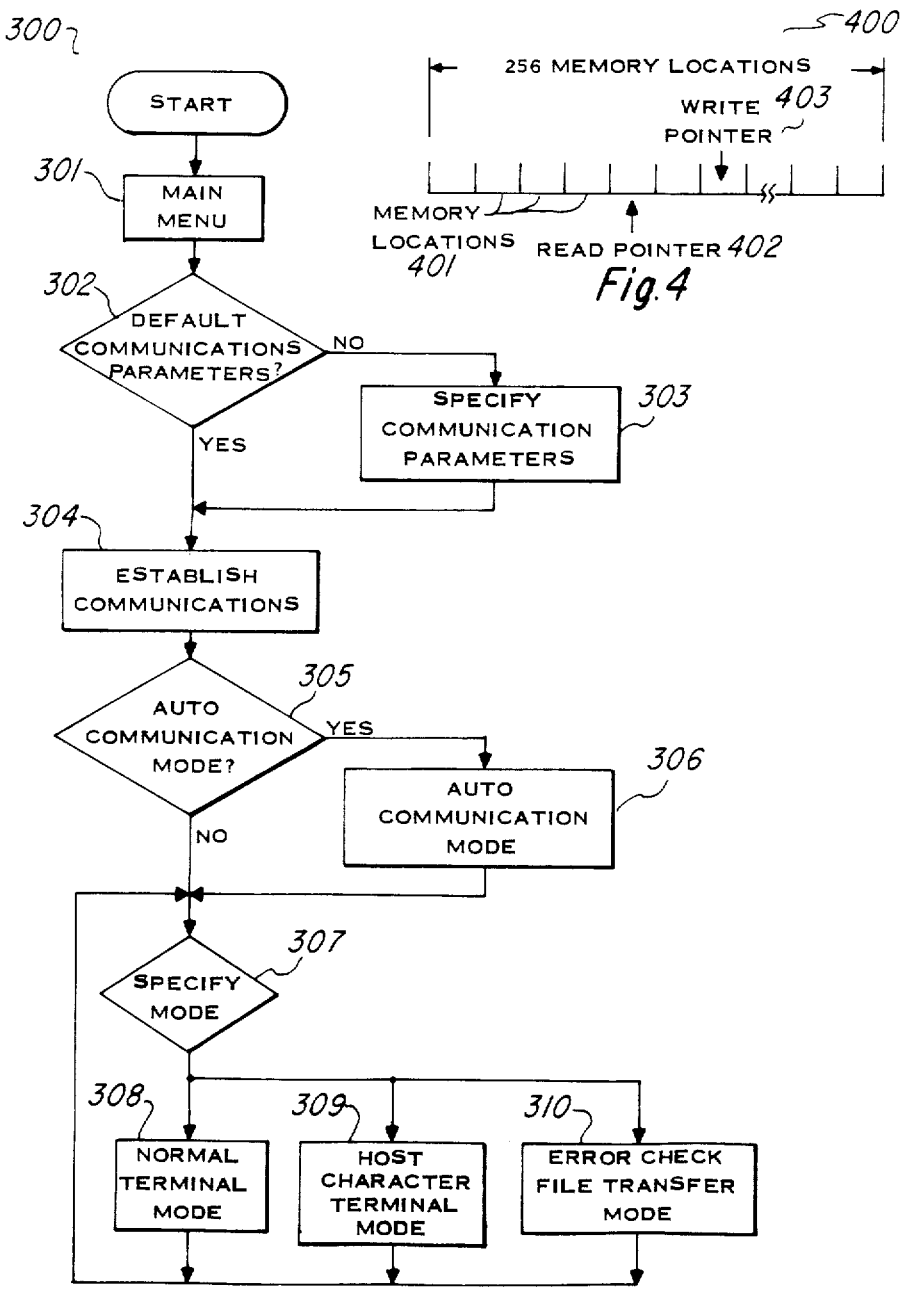
FIG. 3 illustrates a flow chart of the main program of the remote data processing system according to the present invention.
FIG. 4 illustrates in schematic form the circular interrupt buffer employed in a preferred embodiment of the remote data processing system of the present invention.

The data communication system of the present invention involves two main parts, a host data processing system illustrated in FIG. 1 and a remote data processing system illustrated in FIG. 2. These two data processing systems are connected via a communications link and the manner of data communications between these two data processing systems along with communications link is the subject matter of the present invention.

Referring now to FIG. 1, a preferred embodiment of host data processing system 100 is illustrated. Host data processing system 100 preferrably includes central processing unit 101, for performing data processing functions under program control, memory 102, for storing programs for control of central processing unit 101 and data for communication to the remote system, and controller 103 which controls the interface between central processing unit 101 and a plurality of modems 104, 106 and 108 which are connected to respective communication links 105, 107, and 109. Typically host data processing system 100 would be embodied by a large main frame digital computing system operating in a time shared mode. That is, controller 103 controls the communications link between the plurality of remote data processing systems coupled to communication links 105, 107 and 109 and the central processing unit 101 so that at any one time central processing unit 101 is responsive to one and only one of the remote systems. In a typical installation of this type, the processing speed and power of central processing unit 101 is so great relative to the processing demands placed upon it by each of the remote data processing systems coupled to communication links 105, 107 and 109, that the response of data processing unit 101 to the demands placed upon it by the remote data processing systems is substantially simultaneous, despite the fact that central processing unit 101 must service a plurality of remote data processing systems.

In this application modems 104, 106 and 108 are employed to facilitate two-way communications by modulating the signals from central processing unit 101 via controller 103 into a form necessary for transmission over the respective communication links and by demodulating signals received from the respective communication links into a form usable by central processing unit 101. A typical installation of this type would employ a plurality of ordinary audio telephone lines for communication links 105, 107 and 109. In such a case modems 104, 106 and 108 would generate audio tones corresponding to digital data received from controller 103 and would demodulate audio tones received from their respective communication links into digital data pulses readable by central processing unit 101.

The structure of a typical remote data processing system 200 is illustrated in FIG. 2. Data processing system 200 is connected to communications link 105 via a modem 201, which performs an identical function to the modems 104, 106 and 108 described above. Modem 201 is connected to a communication interrupt controller 202 which is in turn connected to central processing unit 203. Due to the limited processing power of a typical central processing unit 203 employed in a remote data processing system 200, it has been found advantageous to enter signals received from communications link 105 into remote data processing system 200 on an interrupt basis under the control of communications interrupt controller 202 in a manner which will be fully described below. Central processing unit 203 besides being controlled by communications interrupt controller 202 is also connected to read only memory 204, random access memory 205, output system 206, input system 211, user nonvolatile read/write memory 212 and plug-in port 221. Typically, the operating system of data processing system 200 is stored in ROM 204, that is the basic set of operating data processing instructions and instruction decode is stored in read only memory 204. Random access memory 205 is typically employed to store executable programs and data and thus may be either written into or read from by central processing unit 203.

Central processing unit 203 typically drives an output system 206 which may include a cathode ray tube type visual display unit 207 for generating a visually perceivable operator output. Output system 206 may also include tone generator 208 and speaker 209 for generating an aurally perceivable output. Lastly, output system 206 may include speech synthesizer 210 which generates one or more words of human language via speaker 209 in response to speech data supplied by central processing unit 203. Central processing unit 203 is made responsive to input system 211, which would typically comprise a keyboard made up of a set of manually actuated key switches. Input system 211 may also include joystick controllers or other user responsive devices. This input system would enable the operator of the remote data processing system 200 to input specific operational commands and/or data for use by central processing unit 203.

Central processing unit 203 is bidirectionally connected to user nonvolatile read/write memory 212. This read/write memory 212 would be employed to permanently store programs for execution by cental processing unit 203 and data generated by central processing unit 203. This read/write memory 212 could be made up of a cassette tape recorder with the required interface circuitry, a floppy disk drive and disk controller or a magnetic bubble memory. Lastly, central processing unit 203 is responsive to a plug-in module 222 which is connected to a plug-in port 221. Plug-in module 222 includes connector 223 for connection to plug-in 221 and read only memory 224. Read only memory 224 has permanently stored therein a program for control of processing tasks performed by central processing unit 203. In the preferred embodiment, all of the programs for control of remote data processing system 200 in relation to the communications via communications link 105 are permanently stored in a plug-in module 222. By use of this technique the data processing system such as remote data processing system 200 can be quickly reconfigured to perform a variety of functions including the data communications functions of the present invention by merely replacing the plug-in module 222 with a module having the appropriate program permanently stored in the read only memory 224 contained therein.

FIG. 3 illustrates a flow chart of the main program executed by the remote data processing system 200 in a preferred embodiment of the present invention. As described above, this program is preferably permanently stored in read only memory 224 as a part of the plug-in module 222. This program is entered by appropriate initialization of remote data processing system 200 to make it responsive to the program, either by loading this program from user nonvolatile read/write memory 211 or by appropriate set up of the program from plug-in module 222. This program preferably begins with a main menu (processing block 301) which presents information to the user, preferably via the cathode ray tube of visual display unit 207, concerning the nature of the program. This visual display serves as a sort of title page for the program. This main menu may be exited automatically via a time delay built into the program or may be exited via a signal from input system 211 such as depression of one or more of the keys of a keyboard.

Decision block 302 presents a user query concerning the communication parameters to be employed by the remote data processing system. Because different host data processing systems to which the remote data processing system may be connected employ differing communication parameters, the main program 300 preferably offers the user a variety of communication parameters in order to match those employed by the host data processing system 100. Communication parameters such as baud rate, parity bits, duplex mode, the I/O port of remote data processing system 200 employed for communications and data record length are typically specified by the host data processing system 100. As shown in decision block 302, this program preferably presents a default set of communication parameters which will be entered unless the user specifies different communication parameters. In a typical system in which the communication between host data processing system 100 and remote data processing system 200 takes place via audible tones on an ordinary telephone line, these default parameters may include a baud rate of 300 bits per second, an even plurality bit, a full duplex communications mode and a data record length of 7 bits. If the user needs to select differing communication parameters then processing block 303 is entered.

Processing block 303 preferably gives the user an option of several baud rates such as 110 bits per second or 300 bits per second, a selection of even, odd or no parity bits and a selection of either full or half duplex communications mode. The selection embodied in processing block 303 preferably involves a menu process. The visual display device 207 preferably displays a plurality of available values and the user depresses one or more keys of a keyboard included within input system 210 to select the desired value. Preferably also the value currently selected for each communication parameter in which the user is given an option is displayed via visual display unit 207 and this display will change upon selection of a valid differing option. Also preferably tone generator 208 and speaker 209 generate a beep tone to warn the user when an invalid input is made.

After specification of the communication parameters either by default or through user selection, communication is established between remote data processing system 200 and host data processing system 100 (processing block 304). In a typical embodiment, this step would require some user interaction by dialing the correct telephone number used by the host data processing system, waiting for the host data processing system to answer the telephone and then properly connecting modem 201 to the telephone line. This may be a direct electrical connection or may involve placing the telephone hand set in an acoustical cradle which is thus acoustically coupled to the telephone line. This establishment of communications may also include exchange between host data processing system 100 and remote data processing system 200 of appropriate handshaking characters and identity code signals.

Once communications are established, the program checks to determine if the user desires to enter the automatic communication mode (decision block 305). The automatic communication mode (processing block 306) is entered if this mode is selected by the user. Once this mode is complete and exited, or if this mode is not desired the user is asked to specify the operating mode (decision block 307).

Decision block 307 preferably offers the user a plurality of operating modes in a menu fashion such as described above. Preferably this mode selection may also take place in response to signals received from host data processing system 100. These operation modes preferably include a normal terminal mode (processing block 308), a host character terminal mode (processing block 309) and an error checking file transfer mode (processing block 310). Exit from any one of these operating modes returns the user to the mode specification menu (decision block 307). The normal terminal mode (processing block 308) preferably operates in the manner of my U.S. Pat. No. 4,377,852 issued Mar. 22, 1983 entitled "TERMINAL EMULATOR". Operation in the host character terminal mode (processing block 309), the automated communication mode (processing block 306) and the error checking file transfer mode (processing block 310) are the subject of the present invention and will be further described below.

It is preferable that signals received by remote data processing system 200 are initially received and temporarily stored on an interrupt basis in order to avoid loss of received signals. FIG. 4 illustrates schematically the memory format of a circular interrupt buffer 400. Circular interrupt bufrer 400 is preferably embodied by a program designated portion of random access memory 205. Circular interrupt buffer 400 preferably includes 256 memory locations 401. Circular interrupt buffer 400 has associated therewith a read pointer 402 and a write pointer 403, each of which identifies a specific one of the memory locations 401. The use of read pointer 402 and write pointer 403 will be fully described below.

Once signals are received they are entered into circular interrupt buffer 400 on an interrupt basis. That is the programmed operation of central processing unit 203 is interrupted so that this signal may be stored in tthe circular interrupt buffer 400. This process is illustrated in interrupt program flow chart 500 of FIG. 5. If a character has been received (decision block 501), then the operation of central processing unit 203 is interrupted (processing block 502). Next the write pointer 403 is incremented (processing block 503) and the received character is stored in the circular interrupt buffer 400 (processing block 504) at the memory location indicated by the write pointer 403. Once the signal has been stored, write pointer 403 indicates the position within the circular interrupt buffer 400 at which the last received signal has been stored. By entering received signals into circular interrupt buffer 400 on an interrupt basis as described above, it is assured that remote data processing system 200 is ready for receiving communications from host data processing system 100 at all times. This insures that no received data is lost because central processing unit 203 is busy performing other programmed tasks.

The circular interrupt buffer 400 is preferably circularly addressed, that is, once all memory locations 401 of the circular interrupt buffer 400 are filled, the next received signal is entered into the first memory location 401. As will be described in greater detail below, circular interrupt buffer 400 will be periodically checked to determine if any new characters have been written therein. The size of circular interrupt buffer 400 should be great enough to prevent loss of received characters by overflowing the capacity of the circular interrupt buffer 400 while central processing unit 203 is performing other tasks between checking the buffer. In addition, the size of this circular interrupt buffer 400 should be kept as small as possible to preserve storage space within random access memory 205 for other uses. In the preferred embodiment, it has been found convenient to employ a circular interrupt buffer 400 having 256 memory locations because a buffer of this size can be conveniently addressed by a single eight bit byte. When incremented, this addressed byte provides an automatic carry over from decimal 255 to decimal 0, thereby automatically providing the required circular addressing.

Various portions of the following description of the operation of the remote data processing system 200 require data processing operations on received signals. A subroutine 600 for readout of data stored in circular interrupt buffer 400 is illustrated in FIG. 6. This subroutine is employed in numerous places in the following program flow charts for the remote data processing system 200. After this subroutine is entered the read pointer 402 is checked to see whether it equals the write pointer 403 (decision block 601). Note that write pointer 403 identifies the last memory location 401 into which a received signal has been entered. Also, as will appear more fully below, read pointer 402 identifies the last memory location 401 which has been read out. If read pointer 402 equals write pointer 403, then all of the data written into circular interrupt buffer 400 has already been read out. In this case the subroutine is exited (processing block 604). If read pointer 402 does not equal write pointer 403 then the program increments read pointer 402 (processing block 602). Thus read pointer 402 now points to the earliest received unread signal. The data at the memory location 401 now identified by read pointer 402 is read out (processing block 603) for storage in a working portion of random access memory 205 whose exact location is dependent upon the details of the particular program employed. After this data is read out from that particular memory location 401 the program returns to decision block 601 to determine if there are additional signals stored in circular interrupt buffer 400 which have not been read out. The program remains in this loop reading out the earliest received unread signal until all of the unread signals have been read out. Then the program exits (processing block 604).

Figure 8:
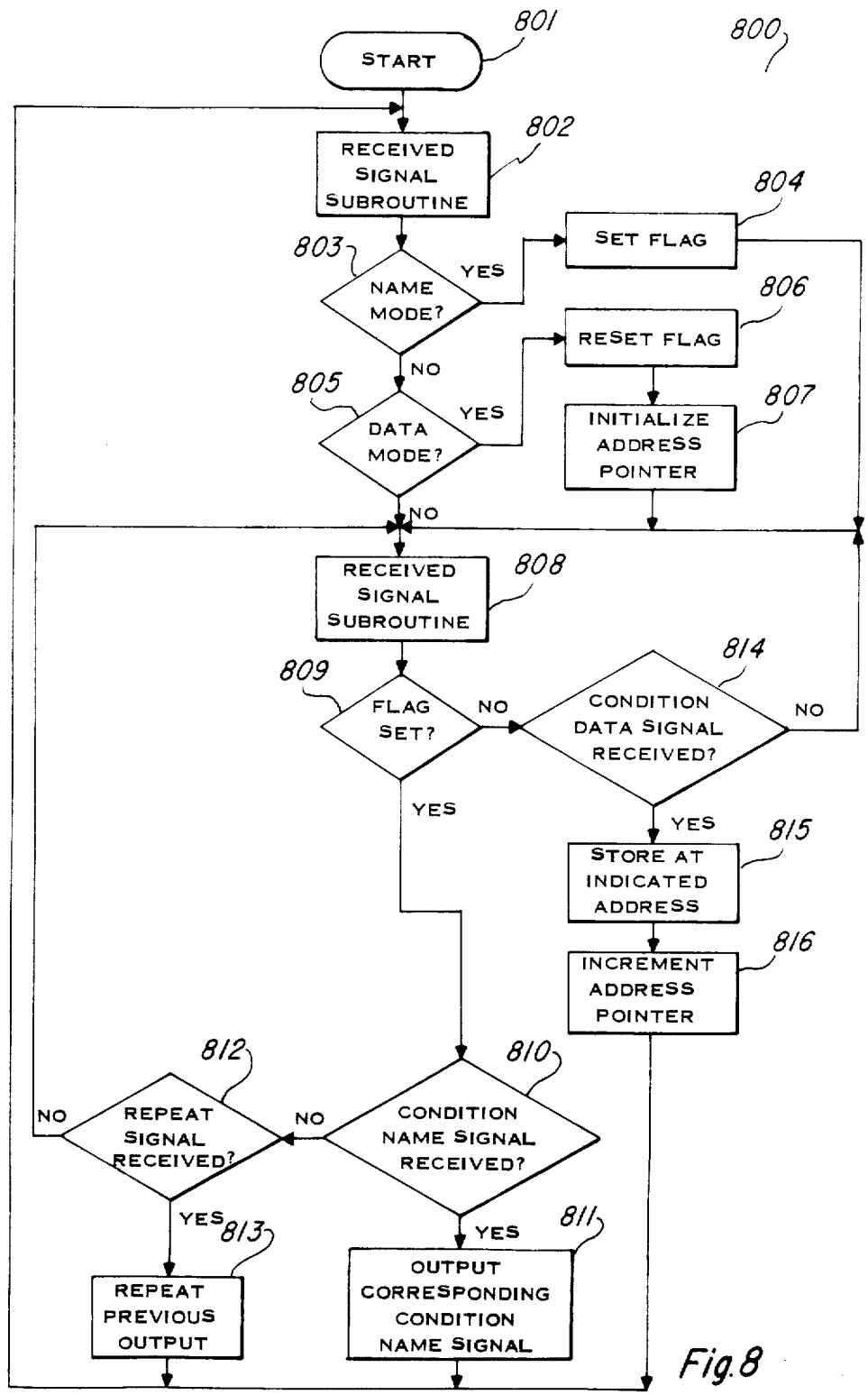
FIG. 8 illustrates a flow chart of one embodiment of the program employed in the remote data processing system in the first aspect of the present invention.
Figure 9:
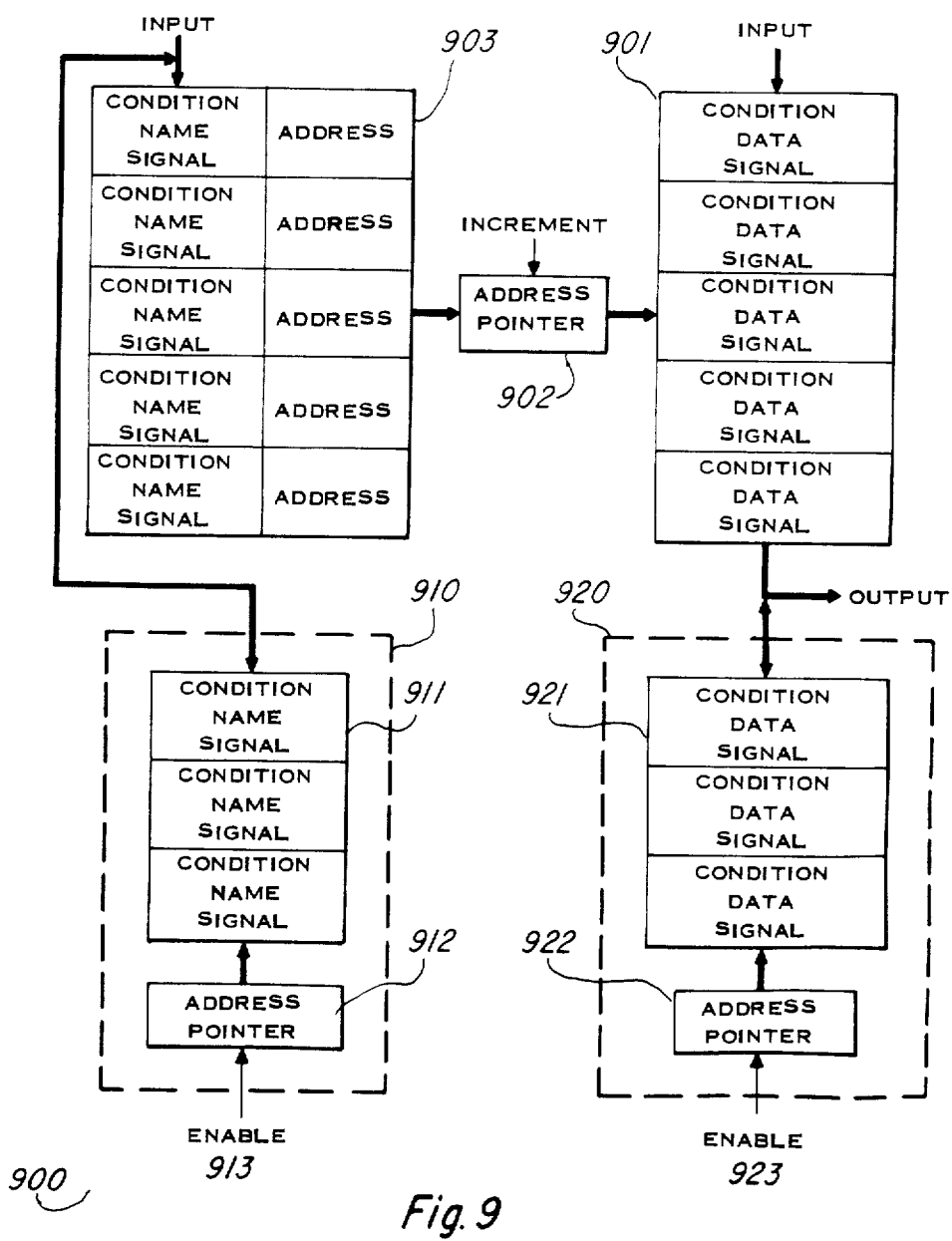
FIG. 9 illustrates the memory organization employed in the remote data processing system according to the first aspect of the present invention.

Now will be described one preferred embodiment of the host character terminal mode in conjunction with the matter illustrated in FIGS. 7, 8 and 9. FIG. 7 illustrates a program flow chart for the host data processing system 100, FIG. 8 illustrates a program flow chart for the remote data processing system 200 and FIG. 9 schematically illustrates the memory organization within remote data processing system 200.

In this preferred embodiment of the host character terminal mode, the host data processing system sends a predetermined number M of condition data signals to remote data processing system 200. These received condition data signals are stored within random access memory 205 for later use. Once this predetermined number of condition data signals has been sent and stored within remote data processing system 200, host data processing system 100 sends a set of condition name signals. Each condition name signal corresponds to one of the M condition data signals previously sent to the remote data processing system 200. Upon receipt of condition name signals, the remote data processing system 200 recalls the corresponding condition data signal for application to the output system 206, either by way of visual display device 207, tone generator 208 and speaker 209, or speech synthesizer 210 and speaker 209.

The condition name signal is equivalent to the address in random access memory 205 at which the corresponding condition data signal is stored. Thus the host data processing system 100 is required to send fewer data bits via the communications link to remote data processing system 200 in order to specify a particular visual display output, tone output or speech output to be generated by data processing system 200 once the condition data signal set has been stored in remote data processing system 200. This data rate advantage is particularly important when the communications link has a relatively low data rate, such as tone signals sent on an ordinary telephone line as described above, and the particular output desired requires a large number of data bits for complete specification, such as presentation of a visual display on visual display device 207 or generation of a speech output by speech synthesizer 210. In such a case, employing the present invention enables the visual display of visual display device 207 to be updated or otherwise changed much more frequently than ordinarily possible due to the reduced number of data bits required to send a condition name signal as opposed to the condition data signal.

FIG. 7 illustrates a flow chart 700 of the program of the host data processing system 100 of one preferred embodiment of the host character terminal mode. The program is entered via start block 701. Firstly, host data processing system 100 sends a condition data transmission mode signal to the remote data processing system 200 (processing block 702). This signal indicates that host data processing system 100 will next send the condition data signal set to the remote data processing system 200 for storage in random access memory 205. Next a count of the condition data signals sent is initialized at 1 (data processing block 703). Next the first condition data signal is sent to the host data processing system 200 (processing block 704). The program then tests whether the count equals M, the total number of condition data signals which data processing system 200 will accept (decision block 705). If the count does not equal M then the count is incremented (processing block 706) and the next condition data signal is transmitted (processing block 704).

If the count equals M, that is if host data processing system 100 has sent each of the M number of condition data signals to the remote data processing system 200, then the condition name transmission mode signal is sent to the remote data processing system 200 (processing block 707). This condition name transmission mode signal alerts the remote data processing system to cease storing received signals in random access memory 205 and to be begin to recall condition data signals specified by received condition name signals. The host data processing system 100 next sends a condition name signal to the remote data processing system 200 (processing block 708). The program then checks to see if a repeat signal is to be transmitted (decision block 709) and if so the repeat signal is transmitted to the remote data processing system 200 (processing block 710). The host data processing system 100 may send additional repeat signals thereafter. In a manner more fully detailed below, this repeat signal causes remote data processing system 200 to repeat an output previously specified by received condition name signals. The program next determines whether additional condition name signals are to be sent to remote data processing system 200 (decision block 711) and if so sends the next condition name signal (processing block 708).

After all of the condition name signals have been sent by the host data processing system 100, the program then tests whether a new condition data signal set is to be sent to remote data processing 200 (decision block 712). If this is the case then the program loops back to the start and performs the same functions again. If this is not so then this program is exited (processing block 713).

It is to be understood that the program illustrated by flow chart 700 may be employed as a subroutine of the basic program for interaction between the host data processing system 100 and the remote data processing system 200, and therefore this program may be executed several times during a particular communications exchange between these two data processing systems.

Flow chart 800 of a program executed by the remote data processing system 200 in this embodiment of the present invention is illustrated in FIG. 8. The program is entered via start block 801. The program firstly interrogates the circular interrupt buffer to determine if data has been received (processing block 802). The received signal subroutine 802 is more fully described above as subroutine 600 illustrated in FIG. 6. Any received data is tested to determine whether or not a condition name transmission mode signal has been received (decision block 803). If such a condition name transmission mode signal has been received, then a flag is set (processing block 804). If the condition name transmission mode signal has not been received the program then tests to determine if the condition data transmission mode signal has been received (decision block 805). If this condition data transmission signal has been received then the flag is reset (processing block 806) and an address pointer, which indicates the address into which the next received condition data signal will be written, is initialized (processing block 807).

Regardless of the results of any of these tests the received signal subroutine is entered (processing block 808). The state of the flag is then tested (decision block 809). If the flag has been set, then the condition name transmission mode signal has been received since the last reception of a condition data transmission mode signal. Any received signals are tested to determine if they are condition name signals (decision block 810). If a condition name signal has been received, then the corresponding condition data signal is output to the output system (processing block 811) and the program returns to the start. If the received signal is not a condition name signal, it is tested to determine if it is a repeat signal (decision block 812). The previously specified output is repeated (processing block 813) in a manner described in conjunction with FIG. 9 if a repeat signal is received. The program then enters the received signal subroutine block 802. If no repeat signal was received, the program enters the received signal subroutine block 808.

If the decision block 809 determines that the flag is reset, then a condition data transmission mode signal has been received since the last condition name transmission mode signal. The program then tests to determine if any received signals are condition data signals (decision block 814). If no condition data signals have been received, the program returns to the received signal subroutine (processing block 808). If a condition data signal is received then it is stored at the address indicated by the address pointer (processing block 815). This address pointer is then incremented to refer to the next address location (processing block 816) and the program returns to the start.

A further explanation of the operation of the remote data processing system 200 in conjunction with this embodiment of the present invention appears below in conjunction with the memory organization illustrated in FIG. 9. In the preferred embodiment, each of the memories described below corresponds to a program designated portion of random access memory 205.

Upon receipt of the condition data transmission mode signal, additional signals are interpreted as condition data signals and are stored in the M memory locations of memory 901. After storing each received condition data signal address pointer 902, which indicates the address location of memory 901 to which data is to be written or from which data is to be read, is incremented. These functions are performed under control of central processing unit 203.

When the condition name transmission mode signal is received, received signals are no longer stored in memory 901. Instead, these signals are employed to determine the address loaded into address pointer 902. In the present embodiment there is a one to one correspondence between received condition name signals and the address whereat the corresponding condition data signal is stored within memory 901. This one to one relationship is illustrated schematically in memory 903. A received condition name signal is found in the left hand portion of this lookup table which then uniquely specifies a particular address to be loaded into address pointer 902. Once this address is loaded into address pointer 902 the condition data signal stored at that address is read out of memory 901 and applied to the output system. It is possible that the condition name signals received from data processing system 100 may be exactly the addresses of the corresponding condition data signals. In such a case these received condition name signals are loaded directly into address pointer 902. In addition it is also possible that received name signals differ from the corresponding address by an additive constant or by some other simple relationship.

In such a case, the processing power of central processing unit 203 may be employed to convert the received condition name signal into the corresponding address and this converted condition name signal is loaded into address pointer 902.

FIG. 9 illustrates two alternative means for causing the repeat of an output previously generated by the remote date processing system 200 in response to receiving condition name signals. In the case in which a visual display unit 207 of the cathode ray tube type is employed, it is understood that some type of display memory means is required, and included within visual display unit 207, in order to effectuate the necessary cathode ray tube refresh to provide a continuous picture. However, under some circumstances a plurality of received condition name signals would provide a sequence of pictures to be displayed by visual display unit 207. In such a case it may be advantageous to enable repeat of this sequence of pictures by reference to signals stored within the remote data processing system 200 without requiring additional communication of the condition name signal sequence from host data processing system 100. In the case of a tone sequence generated by tone generator 208 and speaker 209 or speech generated by speech synthesizer 210 and speaker 209 in response to a set of received condition name signals, it may also be advantageous to employ a means within remote date processing system 200 to repeat the tone sequence without requiring the host data processing system 100 to repeat the condition name signal sequence.

The first of these alternative embodiments is illustrated at 910 in FIG. 9. Repeat means 910 consists of memory 911 and incrementing address pointer 912. During reception of the condition name signals from host data processing system 200 via communications link 105, memory 911 and incrementing address pointer 912 cooperate to enter received condition name signals in sequential memory locations within memory 911. This process is preferably enabled and controlled by central processing unit 203 in response to appropriate input signals from input system 211. Received condition name signals are thus stored within memory 911 in the order in which they are received. Upon actuation of a repeat mode, either on reception of a repeat signal from host data processing system 100 or controlled by central processing unit 203 in response to input signals from input system 211, incrementing address pointer 912 is actuated via repeat input 913 to cause memory 911 to read out the stored condition name signals in the order in which they were stored. These read out condition name signals from memory 911 are applied to lookup table memory 903 in the same manner as condition name signals received from the host data processing system 100. Hence a proper address is loaded into address pointer 902 for each condition name signal recalled from memory 911 and the corresponding condition data signals stored in memory 901 is applied to the output system 206.

An alternative embodiment to repeat a previously designated output is illustrated at 920 in FIG. 9. Repeat means 920 consists of memory 921 and incrementing address pointer 922. When condition data signals are read out from memory 901 in response to receipt of condition name signals from host data processing system 100, these signals are applied to the output system 206 and also applied to memory 921. Memory 921 and incrementing address pointer 922 cooperate under the control of central processing unit 203 in order to store read out condition data signals from memory 901 in memory 921 in the sequence in which they are read out. Upon actuation of the repeat mode via reception of the repeat signal or the appropriate input signals from input system 210, central processing unit 203 applies a signal to repeat input 923 to cause incrementing address pointer 922 and memory 921 to cooperate to read out the condition data signals stored therein in the order in which they are stored and to apply these recall signals to the output system 206. Thus the previously specified output determined by the condition name signals received from host data processing system 100 is repeated.

Figure 10:
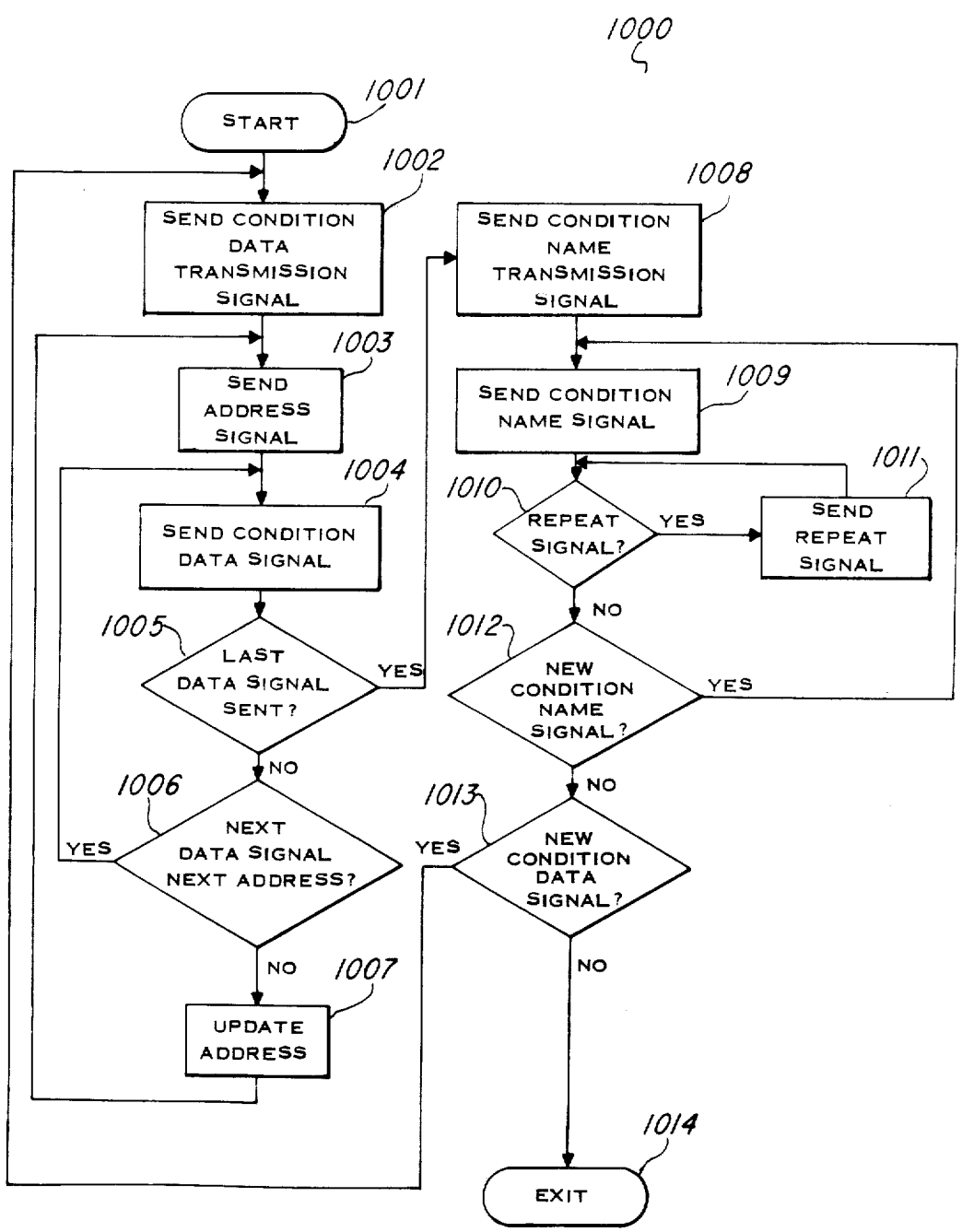
FIG. 10 illustrates a flow chart of the program of the host data processing system according to a second aspect of the present invention.
Figure 11:
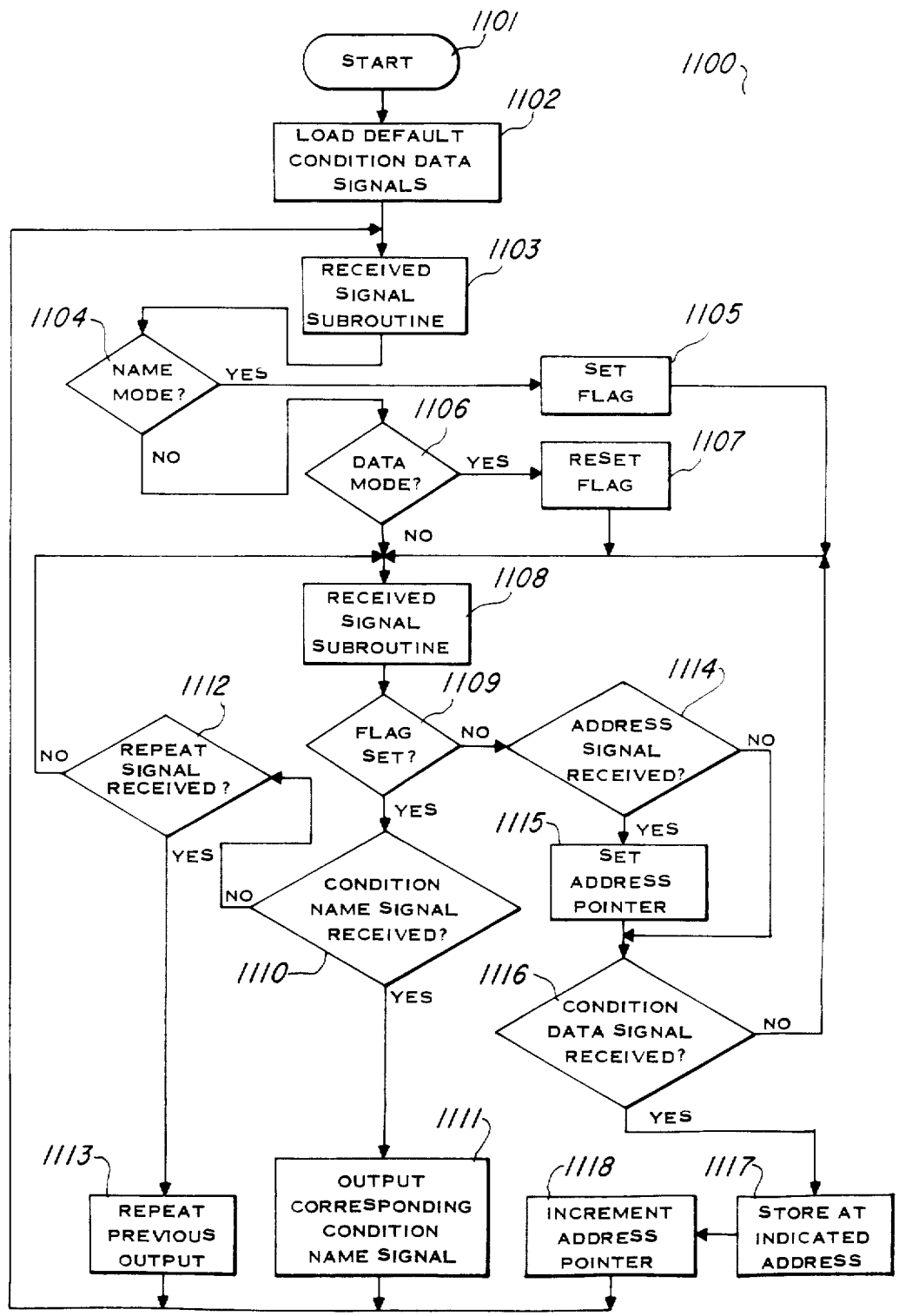
FIG. 11 illustrates a flow chart of the remote data processing system program according to the second aspect of the present invention.
Figure 12:
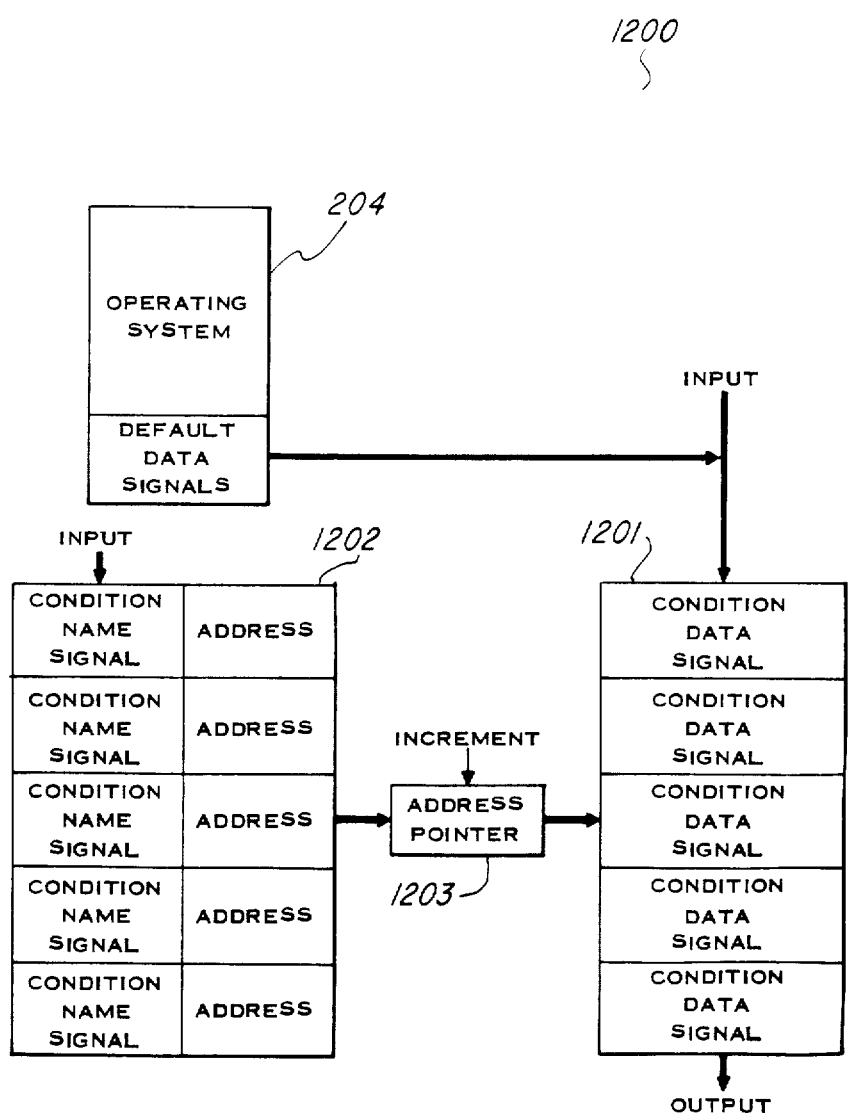
FIG. 12 illustrates a memory organization preferrably employed in the remote data processing system in accordance with the second aspect of the present invention.

Now another preferred embodiment of the host character terminal mode will be described in conjunction with the matter illustrated at FIGS. 10, 11 and 12. FIG. 10 illustrates a program flow chart for the host data processing system 100, FIG. 11 illustrates a program flow chart for the remote data processing system 200 and FIG. 12 schematically illustrates the memory organization within remote data processing system 200.

In this preferred embodiment of the host character terminal mode, host data processing system 100 is not required to send a predetermined number of condition data signals, but rather may send a limited number of condition data signals for storage in specified addresses within remote data processing system 200. These condition data signals are preferably written over default condition data signals which are previously stored within remote data processing system 200. That is, remote data processing system 200 previously has a set of default condition data signals stored therein which may be directly called by host data processing system 100 via the corresponding condition name signal, or which may be written over by specified condition data signals and then called by the corresponding condition name signal. In this system remote data processing system 200 preferably has an automatic incrementing function so that host data processing system 100 may send a plurality of condition data signals for storage at sequential memory locations within remote data processing system 200 by specifying merely the starting memory location.

FIG. 10 illustrates a flow chart 1000 of the program of the host data processing system 100 in this preferred embodiment of the host character terminal mode. The program is entered via start block 1001. Firstly, the host data processing system 100 sends a condition data transmission mode signal to the remote data processing system 200 (processing block 1002). Next the host data processing system 100 sends an address signal (processing block 1003). This address signal specifies a particular memory location within the condition data signal memory of remote data processing system 200 at which the next received condition data signal will be stored. Next host data processing system 100 sends the condition data signal (processing block 1004). As will be further explained below, this condition data signal is stored within random access memory 205 of remote data processing system 200 at an address specified by the previously transmitted address signal.

The program then checks to determine whether the last condition data signal to be sent to remote data processing system 200 has been sent (decision block 1005). If all of the condition data signals have not been sent to remote data processing system 200, the program then checks to determine whether the next condition data signal is to be stored in the next sequential memory location within the condition data memory of remote data processing system 200 (decision block 1006). If the next condition data signal is to be stored in the next sequential memory location, then the program returns to processing block 1004 and sends this next condition data signal. If the next condition data signal is to be stored at an address different from the next sequential address within remote data processing system 200, then an indication of this new address is updated (processing block 1007). The program then returns to processing block 1003 and sends an address signal indicative of this new address. Note that the sending of a new address signal is only required in the instance in which the next condition data signal to be sent is not to be stored in the next sequential memory location within the memory of remote data processing system 200.

Once all of the condition data signals have been sent by host data processing system 100 the program then sends the condition name transmission mode signal (processing block 1008). Next the first condition name signal is transmitted (processing block 1009). The program checks to determine if a repeat signal is to be transmitted (decision block 1010) and if so a repeat signal is sent to remote data processing system 200 (processing block 1011). Additional repeat signals may be sent thereafter. The program then tests to determine whether additional condition name signals are to be transmitted (decision block 1012). If additional condition name signals are to be transmitted, then the program returns to processing block 1009 and sends the next condition name signal. Once all of the required condition name signals have been transmitted, then the program tests to determine whether a new set of condition data signals are to be transmitted to remote data processing system 200 (decision block 1013). If a new set of condition data signals are to be transmitted, then the program returns to the start and sends the condition data mode transmission signal (processing block 1002). If no new set of condition data signals is to be sent, then the program is exited (processing block 1012).

As in the case of flow chart 700 illustrated in FIG. 7, it is to be understood that this program may be employed as a subroutine of the basic program for interaction between host data processing system 100 and remote data processing system 200, and therefore this program may be executed numerous times during a particular communications exchange between these data processing systems.

Flow chart 1100 of a program executed by remote data processing 200 in this embodiment of the present invention is illustrated in FIG. 11. The program is entered via start block 1101. The program firstly loads the default condition data signals into the condition data signal memory in a manner which will be more fully described below in conjunction with a description of the memory organization of remote data processing system 200 in this embodiment (processing block 1102). Next the program interrogates the circular interrupt buffer to determine if data has been received (processing block 1103). As noted previously, this subroutine is described in conjunction with the description of FIG. 6. Any received data is tested to determine whether or not a condition name transmission mode signal has been received (decision block 1104). If such a condition name transmission mode signal has been received, then a flag is set (processing block 1105). If such a condition name transmission mode signal has not been received, the program then tests to determine if the condition data transmission mode signal has been received (decision block 1106). If this condition data transmission mode signal has been received, then the flag is reset (processing block 1107).

Regardless of the results of any of these tests, the received signal subroutine is entered (processing block 1108). The state of the flag is then tested (processing block 1109). If the flag has been set, then the condition name transmission mode signal has been received since the last reception of a condition data transmission mode signal. Any received signals are tested to determine if they are condition name signals (decision block 1110). If a condition name signal has been received, then the corresponding condition data signal is output to the output system 206 (processing block 1111) and the program returns to the start.

If the received signal is not a condition name signal, it is tested to determine if it is a repeat signal (decision block 1112). The previously specified output is repeated (processing block 1113) in the manner described above if a repeat signal is received. The program then enters the received signal subroutine block 1103. If no repeat signal was received, the program enters received signal subroutine block 1108.

If the decision block 1109 determines that the flag is reset, then a condition data transmission mode signal has been received since the last condition name transmission mode signal. The program then tests to determine if any received signal is an address signal (processing block 1114). If an address signal has been received, then the address pointer is set to the address indicated by the address signal (processing block 1115). Regardless of the results of the address signal test, the program then tests to determine whether a condition data signal has been received (decision block 1116). If no condition data signals have been received, the program returns to the received signal subroutine (processing block 1108). If a condition data signal has been received, then it is stored at the address indicated by the address pointer (processing block 1117). This address pointer is then incremented to refer to the next address location (processing block 1118) and the program returns to the start.

Note that this program operates in the same manner as the program illustrated in FIG. 8 with the exception of the initial default condition data signal load (processing block 1102) and the additional steps taken when an address signal is received (decision block 1114 and processing block 1115). The address pointer in remote data processing system 200 is set to the address specified by the address signal received from host data processing system 100 rather than being automatically set to the first address within the condition data signals memory as in the case of the program illustrated in FIG. 8 (processing block 807).

The memory organization 1200 within remote data processing system 200 is illustrated in FIG. 12. The read only memory 204 is illustrated as partitioned into a first section storing the operating system of the remote data processing system and a second section storing default condition data signals. When the remote data processing system enters processing block 1102 to load the default condition data signals, central processing unit 203 controls the transfer of the default condition data signals stored in read only memory 204 into condition data signal memory 1201. Memory 1201 is equivalent to the memory 901 illustrated in FIG. 9. The default condition data signals preferably include outputs of the type that would be frequently called by the host data processing system, such as an alphanumeric character set for visual display via visual display unit 207 or speech data for a set of commonly used words to be generated by speech synthesizer 210.

Received condition data signals are entered into memory 1201 in much the same manner as previously described in conjunction with memory 901. However, occasionally an address signal is received from host data processing system 100. Upon detection of this address signal (decision block 1114), the address pointer 1203 is changed to the address indicated by the received address signal (processing block 1115). The received address signal may be directly loaded into address pointer 1203, or more typically, the received address signal is converted in some manner by central processing unit 203 into the corresponding address and the converted signal is loaded into address pointer 1203. The address stored in address pointer 1203 is incremented after each received condition data signal is loaded into memory 1201 in the manner described in conjunction with FIG. 9.

The received condition data signals may be written over previously stored default condition data signals or may be stored in previously uncommitted portions of memory 1201. Condition name signal/address lookup table memory 1202 operates in the same manner as previously described in conjunction with memory 903. Depending on the signal stored in the corresponding memory location, a received condition name signal may cause an output corresponding to a default condition data signal or a received condition data signal. In addition, it is understood that the memory organization 1200 illustrated in FIG. 12 may also include repeat means corresponding to either of the two alternate repeat means 910 and 920 described in conjunction with FIG. 9.

Figure 13:
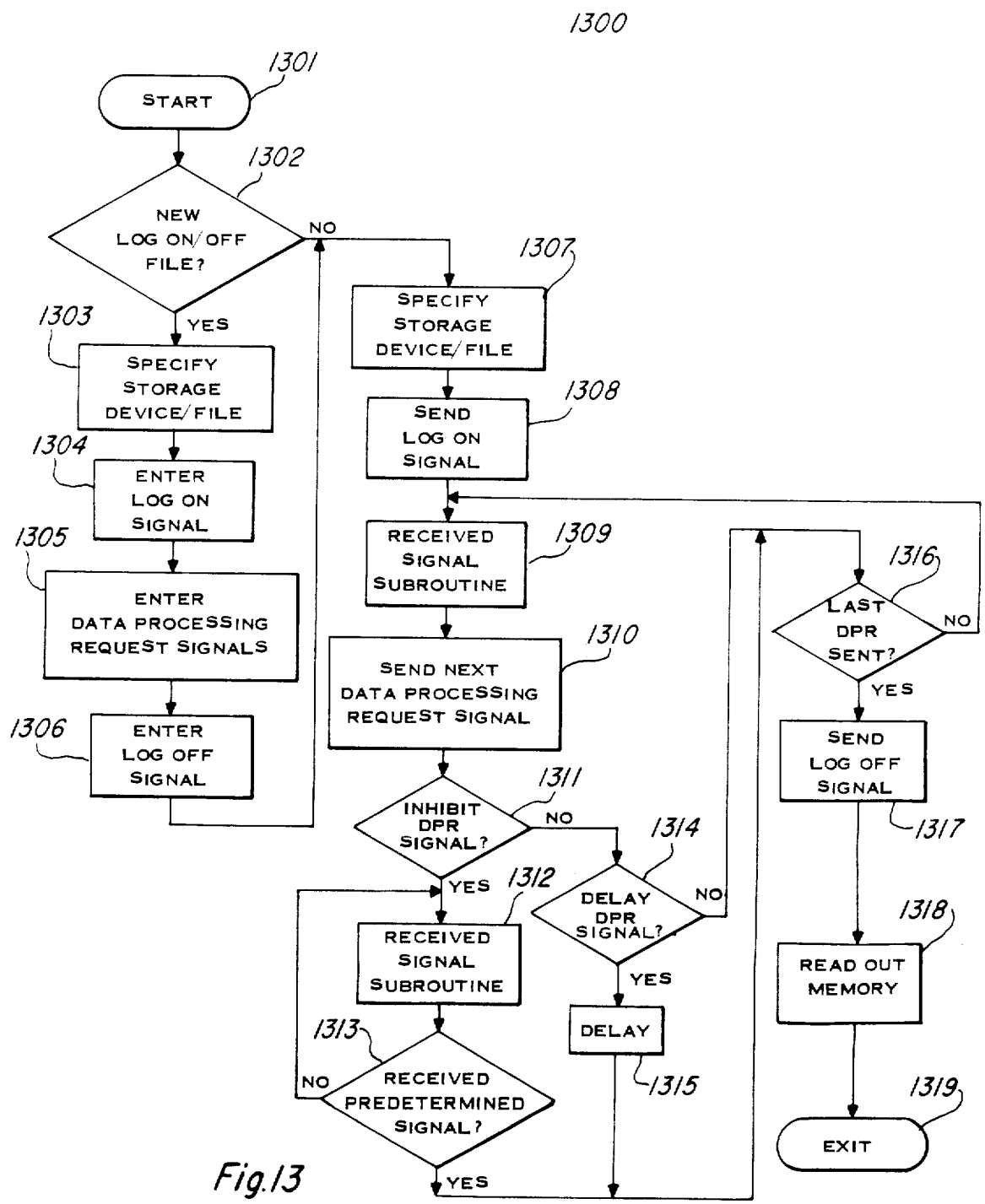
FIG. 13 illustrates a flow chart of a program for the remote data processing system in accordance with a third aspect of the present invention.

Flow chart 1300, illustrating the program of the remote data processing system 200 in a preferred embodiment of the automated communications mode is illustrated in FIG. 13. The program is entered via start block 1301. The program first queries the user as to whether or not a new log on/off file if required (decision block 1302). This query is preferably made via a written text request displayed on visual display unit 207. The operator preferably responds by depressing one or more of the keys of a keyboard included within input system 211. If a new log on/off file is required, then the user must specify the storage device and file in which the new log on/off file is to be stored (processing block 1303). This request is preferably made via a menu process similar to that described above, which gives the user a selection of possible user nonvolatile read/write memories 212 to pick. In the case the read/write memory 212 selected is a disk file, a file name must be generated.

Once the required specification of device and file has been made, then the user is required to enter the log on signal (processing block 1304). This log on signal is then stored in the specified device and file within read/write memory 212. Next the user specifies the data processing request signals desired (processing block 1305). Lastly, the user specifies the log off signal (processing block 1306). All of these required signals are preferrably selected by proper input signals generated by input system 211 applied to central processing unit 203. They are all stored in appropriate memory locations within read/write memory 212. The required log on/off file need not be specified in the manner set forth above. An appropriate log on/off file may be entered directly into read/write memory 212 either by selection of a desired audio cassette, disc or magnetic bubble memory or by reception of such a file from host data processing system 100. If an adequate and appropriate selection of such preprogrammed log on/off files is available then the program blocks 1302, 1303, 1304, 1305 and 1306 may be omitted. In such a case the program would proceed directly from the start (processing block 1301) to the log on-off file storage specification (processing block 1307).

Once a log on/off file has been selected, either by following the loop including processing blocks 1303, 1304, 1305 1306, selecting previously entered and stored log on/off file or selecting an appropriate preprogrammed log on/off file, the program queries the operator to specify a storage device and file from which the automated communications mode will be controlled (processing block 1307). This user query is made in the same manner as the user query of processing block 1303. The user specifies the particular device and file within read/write memory 212 and initiates the automated communications process. The program then sends the log on signal to host data processing system 100 (processing block 1308). Next the program enters the received signal subroutine (processing block 1309) to store any received signals in an appropriate place within RAM 205 in a manner further described above. Next the system sends the next data processing request signal (processing block 1310).

These data processing requests may involve transmission of data to the host data processing system, initiation of data processing functions either on remote data processing system transmitted data or data already stored within the host data processing system or access to a specified portion of the host data processing system memory. Typically, at least some of these data processing requests require transmission of data from remote to host and others require transmission of data from host to remote. The program 1300 illustrated in FIG. 13 provides for two special types of data processing request signals which require special handling within the program.

The first of these in an inhibit data processing request signal which inhibits transmission of further data processing request signals stored within read/write memory 212 until the host data processing system sends a predetermined response signal to the remote data processing system 200. The program tests to determine whether an inhibit data processing signal has been received (processing block 1311). If such an inhibit data processing request signal has been received, the program enters the received signal subroutine (processing block 1312). The program then tests to determine whether any received signals are the predetermined response signal specified by the inhibit data processing request signal (decision block 1313). If the predetermined response signal has been received, then the program continues. However, if the predetermined response signal has not been received, then the program returns to the received signal subroutine (processing block 1312) and remains within this loop until the required predetermined response signal is received. It will be well understood by those skilled in the art that the program may provide for a plurality of different inhibit data processing request signals, each requiring a different predetermined response signal. Thus the program may include a number of subroutines such as that specified by data processing blocks 1311, 1312 and 1313.

If the previous sent data processing request signal was not an inhibit data processing request signal, then the program tests to determine whether this signal is a delay data processing request signal (decision block 1314). A delay data processing request signal is a special signal that can be employed when it is assumed that the host data processing system 100 will send a relatively large amount of data to the remote data processing system 200 or will require a fairly well defined time interval for performing a particular data processing request. This data processing request may be followed by the delay data processing request signal which should specify the particular delay required and transmission of further data processing request signals to host data processing system 100 would be inhibited until this delay has passed. Preferably these delay data processing request signals include a user specified time interval signal which is employed to set the amount of delay involved. If such a delay data processing request signal is recalled, then the program enters a delay block 1315. This delay block preferably causes a delay in transmission of the next data processing request signal which has been specified by the particular delay processing request signal. In addition, it is preferable that the program periodically and repetitively enter the received signal subroutine during this delay in order to prevent the possibility of overflow of data within circular interrupt buffer 400. Once this delay has passed the program continues.

The program determines whether the last data processing request signal specified in the log on/off file has been sent (decision block 1316). If the last data processing request signal has not been sent, then the program returns to receive signal subroutine (processing block 1309) and then sends the next data processing request (processing block 1310). If the last data processing request signal has been transmitted to the host data processing system 100, then the program transmits the log off signal (processing block 1317). The automated communications specified by the data request signals stored in the read/write memory 211 is thus complete. The log off signal may be one employed to terminate the processes of the host data processing system 100. The program then permits the user to read out and review the data stored in random access memory 205 which was received in response to the data processing request signals sent during this automated process (processing block 1318). The review of received data preferably takes place in a manner similar to that described in my U.S. Pat. No. 4,377,852 cited above. After this has been accomplished, the program is exited (processing block 1319).

Figure 14:
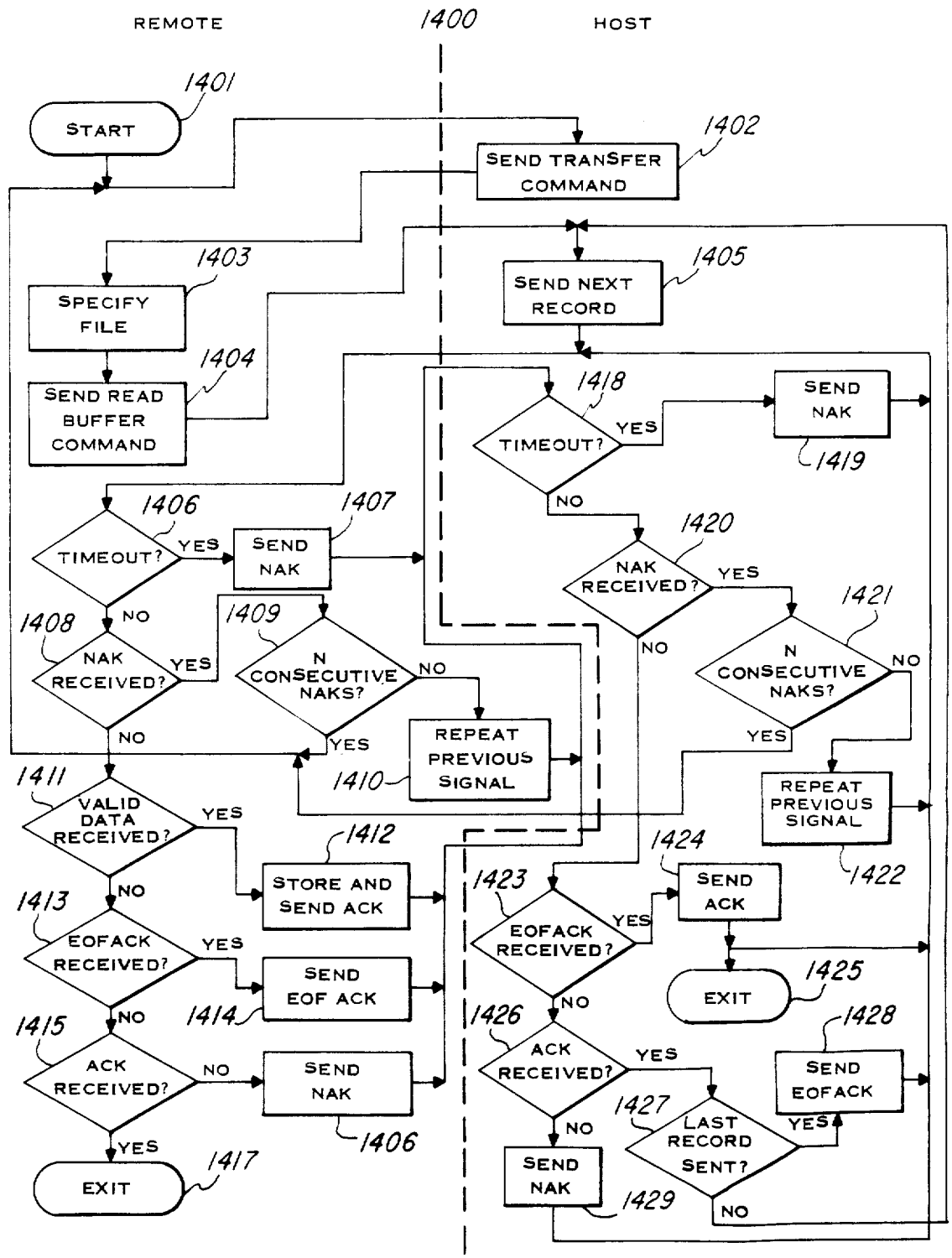
FIG. 14 illustrates a combined flow chart for the host and remote data processing systems in accordance with a fourth aspect of the present invention.

Flow chart 1400 illustrates a combined program required for both the host and the remote data processing systems for implementing the error checking file transfer mode. It should be noted that in FIG. 14 those data processing blocks appearing on the left hand portion of the flow chart are implemented in the remote data processing system and those data processing blocks appearing on the right hand portion are implemented by the host data processing system.

The program is entered by start block 1401. The host data processing system first sends a transfer command to the remote data processing system (processing block 1402). The user of the remote data processing system is required to specify a file for storage of the received data by appropriate input by input system 211 (processng block 1403). The system is then begun by sending a read buffer command to the host data processing system (processing block 1404). The host data processing system then sends a data record to the remote data processing system (processing block 1405).

This data record preferably includes plurality of data portions and a redundancy portion used to check the transmission accuracy of the data record. A preferred form of error checking code is a logical redundancy check in which each of the data portions are logically exclusive ORed to obtain the redundancy portion. Remote data processing system 200 checks to determine whether a predetermined amount of time has elapsed since reception of the last signal (decision 1406). If this has occurred, remote data processing system 200 sends a nonacknowledgment signal designated NAK (processing block 1407). If this has not occurred, then the remote system checks to determine whether a similar NAK signal has been received from the host data processing system (decision block 1408). If such a NAK signal has been received, the program then tests to determine whether a predetermined number N of consecutive NAK signals have been received (decision block 1409). If the transmission via communications link 105 is extremely garbled, or if the host and remote data processing systems are not communicating properly, then the systems will continue to send NAK signals to each other. Rather than permitting the program to remain in this state, if either system receives a predetermined number of consecutive NAK signals, the program is reset to the start (processing block 1401). It has been found preferable to set this predetermined number at 5. Assuming that 5 previous consecutive NAK signals have not been received, then the remote data processing system 200 repeats the previous signal (processing block 1410).

If the received signal by the remote data processing system 200 is not a NAK signal, then the program tests to determine whether it is a valid data signal (decision block 1411). This test for valid data includes performing the error checking function, such as taking an exclusive OR of all of the data portions of the received record and comparing this logically combined signal with the redundancy portion. If these are identical, then the entire record has been received correctly and the program stores these received signals in random access memory 205 and in the specified location within read/write memory 212 and sends an acknowledge signal designated ACK to the host data processing system (processing block 1412). In this application the data format as to record length is specified by the format of the data transmitted by host data processing system 100. Remote data processing system 200 preferably includes a program to check the received data record length format against the data record length format required by the specified portion of read/write memory 212 and to reformat the data if possible to fit the word length required by the specified portion of read/write memory 212 if these record lengths differ.

If the received signal is not a valid data record, then the program tests to determine whether it is an end of file acknowledge signal designated EOFACK (decision block 1413). If the received signal is an EOFACK, then the remote data processing system 200 transmits a similar EOFACK signal (processing block 1414).

If the received signal is not an EOFACK signal, the program tests to determine whether it is an ACK signal.

Reception of an ACK signal by the remote data processing system 200 indicates that transmission of the record has been complete thus the program is exited (processing block 1417). If the received signal is not an ACK signal, then the received signal has not been identified and the remote data processing system 200 sends a NAK signal (processing block 1416).

The host data processing system 100 receives the previously described hand shaking signals from the remote data processing system 200 and interprets them in a manner to control the transmission of data records to the remote data processing system 200. Firstly, the program tests to determine whether a predetermined period of time has elapsed since the receipt of the last signal from the remote data processing system 200 when an outstanding signal is required from the remote data processing system 200 (decision block 1418). In the event that a signal is required from remote data processing system 200 and has not been received within the predetermined time limit, the system sends a NAK signal to the remote data processing system 200 (processing block 1419).

In the event that time out has not occurred, the program tests to determine whether the received signal is a NAK signal (decision block 1420). If the received signal is an NAK signal, the program tests to determine whether the predetermined number N of consecutive NAK signals has been received (decision block 1421). This is an identical function to that performed by processing block 1409 occurring in the remote data processing system. If this number of consecutive NAK signals has been exceeded, then the system returns to the start. If this consecutive number of NAK signals has not been exceeded, then the system retransmitts the previously transmitted signal (processing block 1422).

In the event that the received signal is not an NAK signal, the program determines whether the received signal is an EOFACK signal (decision block 1422). If this is the case, the host data processing system 100 sends an ACK signal (processing block 1424) and exits its portion of the program (processing block 1425).

If the received signal is not an EOFACK signal, the program tests to determine whether the received signal is an ACK signal (decision block 1426). If an ACK signal has been received, then the program tests to determine whether the last data record has been transmitted (decision block 1427). If the last data record has been transmitted, then the program transmitts an EOFACK signal to the host data processing system 200 (processing block 1428). However, if the last data record has not been sent, then the program returns to send the next data record (processing block 1405). Assuming that the received signal was not an ACK signal, then the program has failed to interpret the received signal as a proper signal and sends a NAK signal to the remote data processing system (processing block 1429).

I claim:

1. A data communication system comprising:

a host data processing system having a condition data signal generating means for generating a set of a plurality of condition data signals each having a corresponding condition name signal, a condition name signal generating means for generating a sequence of condition name signals and for generating a repeat signal, a data transmission means for transmitting data, and a mode selection means connected to said data transmission means for entering a condition data transmission mode thereupon causing said data transmission means to transmit a condition data transmission mode signal and thereafter to transmit said set of condition data signals, and for entering a condition name transmission mode and thereupon causing said data transmission means to transmit a condition name transmission mode signal and thereafter to transmit said sequence of condition name signals and said repeat signal;

a data communication means connected to said data transmission means of said host data processing system for communication of said data transmitted by said data transmission means; and a remote data processing system having a receiving means connected to said data communication means for receiving data from said host data processing system, a memory means having a plurality of memory locations for storing data, a memory access means for recalling data from selected memory locations of said memory means, mode determination means connected to said receiving means for entering a condition data transmission mode upon receipt of a condition data transmission mode signal whereupon the next received condition data signals are stored in memory locations of said memory means and for entering a condition name transmission mode upon receipt of a condition name transmission mode signal whereupon said memory access means recalls condition data signals from memory location is of said memory means corresponding to the next received condition name signals, an output means for generating an operator perceivable indication corresponding to said recalled condition data signals, a condition name signal storage means connected to said memory access means for storing received condition name signals therein, and a repeat means connected to said receiving means and said condition name signal storage means for initiating recall of said condition name signals stored therein for application to said memory access means to recall condition data signals from said memory means corresponding to said condition name signals recalled from said condition name signal storage means upon reception of said repeat signal, whereby said output means repeats said operator perceivable indication corresponding to said condition name signals stored in said condition name signal storage means.

2. A data communication system comprising:

a host data processing system having a condition data signal generating means for generating a set of a plurality of condition data signals each having a corresponding condition name signal, a condition name signal generating means for generating a sequence of condition name signals and for generating a repeat signal, a data transmission means for transmitting data, and a mode selection means connected to said data transmission means for entering a condition data transmission mode thereupon causing said data transmission means to transmit a condition data transmission mode signal and thereafter to transmit said set of condition data signals, and for entering a condition name transmission mode and thereupon causing said data transmission means to transmit a condition name transmission mode signal and thereafter to transmit said sequence of condition name signals and said repeat signal;

a data communication means connected to said data transmission means of said host data processing system for communication of said data transmitted by said data transmission means; and a remote data processing system having a receiving means connected to said data communication means for receiving data from said host data processing system, a memory means having a plurality of memory locations for storing data, a memory access means for recalling data from selected memory locations of said memory means, mode determination means connected to said receiving means for entering a condition data transmission mode upon receipt of a condition data transmission mode signal whereupon the next received condition data signals are stored in memory locations of said memory means and for entering a condition name transmission mode upon receipt of a condition name transmission mode signal whereupon said memory access means recalls condition data signals from memory locations of said memory means corresponding to the next received condition name signals, an output means for generating an operator perceivable indication corresponding to said recalled condition data signals, a repeat memory means for storing recalled condition data signals therein, and a repeat means connected to said receiving means, said repeat memory means and said output means for applying said condition data signals stored in said repeat memory means to said output means upon reception of said repeat signal, whereby said output means repeats said operator perceivable indication corresponding to said condition data signal stored in said repeat memory means.

3. A data communication system comprising:

a host data processing system having a condition data signal generating means for generating a set of a plurality of condition data signals each having a corresponding condition name signal, a condition name signal generating means for generating a sequence of condition name signals, a data transmission means for transmitting data, and a mode selection means connected to said data transmission means for entering a condition data transmission mode thereupon causing said data transmission means to transmit a condition data transmission mode signal and thereafter to transmit said set of condition data signals, and for entering a condition name transmission mode and thereupon causing said data transmission means to transmit a condition name transmission mode signal and thereafter to transmit said sequence of condition name signals;

a data communication means connected to said data transmission means of said host data processing system for communication of said data transmitted by said data transmission means; and a remote data processing system having a receiving means connected to said data communication means for receiving data from said host data processing system, a memory means having a plurality of memory locations for storing data, a memory access means for recalling data from selected memory locations of said memory means, mode determination means connected to said receiving means for entering a condition data transmission mode upon receipt of a condition data transmission mode signal whereupon the next received condition data signals are stored in memory locations of said memory means and for entering a condition name transmission mode upon receipt of a condition name transmission mode signal whereupon said memory access means recalls condition data signals from memory locations of said memory means corresponding to the next received condition name signals, an output means for generating an operator perceivable indication corresponding to said recalled condition data signals, a condition name signal storage means connected to said memory access means for storing received condition name signals therein, and an operator actuable output repeat means connected to said condition name signal storage means for initiating recall of said condition name signals stored therein for application to said memory access means to recall condition data signals from said memory means corresponding to said condition name signals recalled from said condition name signal storage means, whereby said output means repeats said operator perceivable indication corresponding to said condition name signals stored in said condition name signal storage means.

4. A data communication system comprising:

a host data processing system having a condition data signal generating means for generating a set of a plurality of condition data signals each having a corresponding condition name signal, a condition name signal generating means for generating a sequence of condition name signals, a data transmission means for transmitting data, and a mode selection means connected to said data transmission means for entering a condition data transmission mode thereupon causing said data transmission means to transmit a condition data transmission mode signal and thereafter to transmit said set of condition data signals, and for entering a condition name transmission mode and thereupon causing said data transmission means to transmit a condition name transmission mode signal and thereafter to transmit said sequence of condition name signals;

a data communication means connected to said data transmission means of said host data processing system for communication of said data transmitted by said data transmission means; and a remote data processing system having a receiving means connected to said data communication means for receiving data from said host data processing system, a memory means having a plurality of memory locations for storing data, a memory access means for controlling data from selected memory locations of said memory means, mode determination means connected to said receiving means for entering a condition data transmission mode upon receipt of a condition data transmission mode signal whereupon the next received condition data signals are stored in memory locations of said memory means and for entering a condition name transmission mode upon receipt of a condition name transmission mode signal whereupon said memory access means recalls condition data signals from memory locations of said memory means corresponding to the next received condition name signals, an output means for generating an operator perceivable indication corresponding to said recalled condition data signals, a repeat memory means for storing recalled condition data signals therein and an operator actuable output repeat means connected to said repeat memory means and said output means for applying said condition data signals stored in said repeat memory means to said output means, whereby said output means repeats said operator perceivable indication corresponding to said condition data signal stored in said repeat memory means.

5. A data processing system comprising:

a receiving means connected to a data communication means for receiving signals transmitted by said data communication means;

detecting means responsive to said received signals for detecting the receipt of condition data transmission mode signals, condition name transmission mode signals and repeat signals;

a memory means having a plurality of memory locations for storing data;

a memory access means for recalling data from selected memory locations of said memory means;

a mode determination means connected to said detecting means for entering a condition data transmission mode upon detection of a condition data transmission mode signal whereupon the next received signals are designated as condition data signals and are stored in memory locations of said memory means and for entering a condition name transmission mode upon detection of a condition name transmission mode signal whereupon the next received signals are designated as condition name signals and said memory access means recalls condition data signals from memory locations of said memory means corresponding to said received condition name signals;

a condition name signal storage means connected to said receiving means and said mode determination means for storing received signals therein when in said condition name transmission mode;

an output means for generating an operator perceivable indication corresponding to said recalled condition data signals; and a repeat means connected to said detecting means and said condition name signal storage means for initiating recall of said condition name signal stored in said condition name storage means for application to said memory access means to recall condition data signals corresponding to said condition name signal stored in said condition name signal storage means upon detection of said repeat signal, whereby said output means repeats said operator perceivable indication corresponding to said condition name signals stored in said condition name signal storage means.

6. A data processing system comprising:

a receiving means connected to a data communication means for receiving signals transmitted by said data communication means;

detecting means responsive to said received signals for detecting the receipt of condition data transmission mode signals, condition name transmission mode signals and repeat signals;

a memory means having a plurality of memory locations for storing data;

a memory access means for recalling data from selected memory locations of said memory means;

a mode determination means connected to said detecting means for entering a condition data transmission mode upon detection of a condition data transmission mode signal whereupon the next received signals are designated as condition data signals and are stored in memory locations of said memory means and for entering a condition name transmission mode upon detection of a condition name transmission mode signal whereupon said next received signals are designated as condition name signals and said memory access means recalls condition data signals from memory locations of said memory means corresponding to said received condition name signals; and a repeat memory means connected to said memory means for storing recalled condition data signals therein;

an output means for generating an operator perceivable indication corresponding to said recalled condition data signals; and a repeat means connected to said detecting means, said output means and said repeat memory means for applying condition data signals stored in said repeat memory means to said output means upon detection of said repeat signal, whereby said output means repeats said operator perceivable indication corresponding to said condition name signals stored in said condition name signal storage means.

7. A data processing system comprising:

a receiving means connected to a data communication means for receiving signals transmitted by said data communication means;

detecting means responsive to said received signals for detecting the receipt of condition data transmission mode signals and condition name transmission mode signals;

a memory means having a plurality of memory locations for storing data;

a memory access means for recalling data from selected memory locations of said memory means;

a mode determination means connected to said detecting means for entering a condition data transmission mode upon detection of a condition data transmission mode signal whereupon the next received signals are designated as condition data signals and are stored in memory locations of said memory means and for entering a condition name transmission mode upon detection of a condition name transmission mode signal whereupon said next received signals are designated as condition name signals and said memory access means recalls condition data signals from memory locations of said memory means corresponding to said received condition data signals; and condition name signal storage means connected to said receiving means and said mode determination means for storing received signals therein when in said condition name transmission mode;

an output means for generating an operator perceivable indication corresponding to said recalled condition data signals; and an operator actuable output repeat means connected to said condition name signal storage means for initiating recall of said condition name signal stored in said condition name storage means for application to said memory access means to recall condition data signals corresponding to said condition name signal stored in said condition name signal storage means, whereby said output means repeats said operator perceivable indication corresponding to said condition name signals stored in said condition name signal storage means.

8. A data processing system comprising:
a receiving means connected to a data communication means for receiving signals transmitted by said data communication means;
detecting means responsive to said received signals for detecting the receipt of condition data transmission mode signals and condition name transmission mode signals;
a memory means having a plurality of memory locations for storing data;
a memory access means for recalling data from selected memory locations of said memory means;
a mode determination means connected to said detecting means for entering a condition data transmission mode upon detection of a condition data transmission mode signal whereupon the next received signals are designated as condition data signals and are stored in memory locations of said memory means and for entering a condition name transmission mode upon detection of a condition name transmission mode signal whereupon said next received signals are designated as condition name signals and said memory access means recalls condition data signals from memory locations of said memory means corresponding to said received condition name signals; and
a repeat memory means connected to said memory means for storing recalled condition data signals therein;
an output means for generating an operator perceivable indication corresponding to said recalled condition data signals; and
an operator actuatable repeat means connected to said repeat memory means and said output means for applying condition data signals stored in said repeat memory means to said output means, whereby said output means repeats said operator perceivable indication corresponding to said condition data signals stored in said repeat memory means.

9. A data communication system comprising:
a host data processing system having a condition data signal generating means for generating a set of a plurality of condition data signals each having a corresponding condition name signal, a condition name signal generating means for generating a sequence of condition name signals, a data transmission means for transmitting data, and a mode selection means connected to said data transmission means and for entering a condition data transmission mode thereupon causing said data transmission means to a transmit a condition data transmission mode signal and thereafter to transmit said set of condition data signals, and for entering a condition name transmission mode and thereupon causing said data transmission means to transmit a condition name transmission mode signal and thereafter to transmit said sequence of condition name signals;
a data communication means connected to said data transmission means of said host data processing system for communication of said data transmitted by said data transmission means; and
a remote data processing system having a receiving means connected to said data communications means for receiving data from said host data processing system, a memory means having a plurality of memory locations for storing data, a memory access means for recalling data from selected memory locations of said memory means, mode determination means connected to said receiving means for entering a condition data transmission mode upon receipt of a condition data transmission mode signal whereupon the next received condition data signals are stored in memory locations of said memory means and for entering a condition name transmission mode upon receipt of a condition name transmission mode signal whereupon said memory access means recalls condition data signals from memory locations of said memory means corresponding to the next received condition name signals, and an output means connected to said memory access means for generating an operator perceivable indication corresponding to said recalled condition data signals.

10. A data communications system as claimed in claim 9, wherein:
said condition data signal generating means comprises means for generating a predetermined number of condition data signals; and
said memory means further comprises said predetermined number of sequentially accessed memory locations and means for storing said received condition data signals in corresponding sequential memory locations when in said condition data transmission mode.

11. A data processing system comprising:
receiving means connected to a data communication means for receiving signals transmitted by the data transmission means;
detecting means responsive to said received signals for detecting the receipt of condition data transmission mode signals and condition name data transmission mode signals;
memory means having a plurality of memory locations for storing data;
memory access means for recalling data stored at selected memory locations of said memory means;
mode detection means connected to said detecting means for entering a condition data transmission mode upon detection of a condition data transmission mode signal whereupon the next received signals are stored in said memory means and for entering a condition name transmission mode upon detection of a condition name transmission mode signal whereupon said memory access means recalls data from memory locations of said memory means corresponding to the next received signals; and
output means connected to said memory access means for generating an operator perceivable indication corresponding to said data recalled by said memory access means.

12. A data processing system as claimed in claim 11, wherein:
said memory means further comprises a predetermined number of sequentially accessed memory locations and means for storing said received signals in corresponding sequential memory locations when in said condition data transmission mode.

13. A data communications system as claimed in claim 9, wherein:
said host data processing system further comprises means for generating at least one memory location signal corresponding to a memory location of said memory means of said remote data processing system;

said memory means further comprises a plurality of sequentially accessed memory locations; and said remote data processing system further comprises a memory storage control means, connected to receiving means and said memory means, responsive to a received memory location signal for causing said memory means to store the next received condition data signals in sequential memory locations in said memory beginning with said memory location corresponding to said received memory location signal.

14. A data communication system as claimed in claim 9, wherein:

said condition data signal generating means further comprises means for generating condition data signals corresponding to audible tones; and said output means comprises a tone generator means for sequentially generating an aurally perceivable output corresponding to said recalled condition data signals.

15. A data communications system as claimed in claim 9, wherein:

said condition data signal generating means further comprises means for generating condition data signals corresponding to speech data representing one or more words of human language; and said output means further comprises a speech synthesizer means for generating an aurally perceivable output of one or more words of human language corresponding to said recalled condition data signals.

16. A data processing system as claimed in claim 11, wherein:

said detecting means further comprises means for detecting the receipt of memory location signals;

said memory means further comprises a plurality of sequentially accessed memory locations; and said data processing means further comprises a memory storage control means, connected to said detecting means and said memory means, responsive to the detection of a memory location signal for causing said memory means to store the next received signals in sequential memory locations in said memory beginning with said memory location corresponding to said detected memory location signal when in said condition data transmission mode.

17. The data processing system as claimed in claim 11, wherein:

said output means further comprises a visual display means for continuously generating a visually perceivable display comprising pictorial elements corresponding to said recalled condition data signals.

18. A data processing system as claimed in claim 11, wherein:

said output means comprises a tone generator means for sequentially generating an aurally perceivable output corresponding to said recalled condition data signals.

19. A data processing system as claimed in claim 11, wherein:

said output means further comprises a speech synthesizer means for generating an aurally perceivable output on one or more words of human language corresponding to said recalled condition data signals.

* * * * *